United States Patent Office 3,478,001
Patented Nov. 11, 1969

3,478,001
ACRYLONITRILE COPOLYMERS WITH UNSATURATED SULFOBETAINES AND PROCESS FOR PREPARING SAME
Jeno Szita, Dormagen, Ulrich Bahr, Leverkusen, and Horst Wieden and Herbert Marzolph, Dormagen, and Gunther Nischk, Leverkusen, Germany, assignors to Farbenfabriken Bayer Aktiengesellschaft, Leverkusen, Germany, a corporation of Germany
No Drawing. Filed Jan. 25, 1965, Ser. No. 427,915
Claims priority, application Germany, Feb. 6, 1964, F 41,927
Int. Cl. C08f 15/38, 47/12
U.S. Cl. 260—79.3     12 Claims

ABSTRACT OF THE DISCLOSURE

Dye-receptive amphoteric copolymer produced by copolymerizing at least about 80% by weight acrylonitrile and a polymerizable unsaturated sulfobetaine.

---

This invention relates to copolymers of acrylonitrile and sulfobetaines and to the production of special acrylonitrile polymers which are distinguished by an exceptional affinity both for anionic and for cationic dyes.

It is known that acrylonitrile can be polymerised in aqueous medium in the acid pH-range, alone or in admixture with other polymerisable monomers, using redox catalyst systems. The resulting polymers may be processed by conventional methods, for example, into threads and films. Unfortunately, the affinity of these products for conventional dyes is not sufficient to obtain practically useful dark shades. The cause of this is the absence or deficiency of dye-receptive groups in the polymer. For this reason, attempts are often made to produce an affinity for basic (cationic) or acid (anionic) dye by copolymerising acrylonitrile with compounds which contain either acidic or basic groups, for example, styrene sulphonic acid or vinyl pyridine. Because acrylic polymers are sensitive to basic compounds, showing a marked tendency towards yellowing under the influence of heat, the nature and quantity of basic comonomers that can be used are confined within very narrow limits. If basic co-components containing secondary or tertiary amino groups are used, further difficulties arise during polymerisation if, as is normally the case, redox systems with peroxide compounds, or peroxide compounds alone, are used as the initiator. The reason is that the aforementioned co-components take part in the initiating reaction and termination reaction, so that the polymerisation velocity and molecular weight, too, are considerably reduced. The resulting polymers contain basic terminal groups which further increase the already mentioned tendency towards yellowing. The polymerisation is also greatly affected by the presence of oxygen so that usually polymerisation will not take place at all in the presence of air.

It is also known that acrylonitrile copolymers which contain both basic and acid co-components can be prepared. For this purpose, for example, polymerisable, monoethylenically unsaturated sulphonic acids or their water-soluble salts and unsaturated quaternary ammonium salts are polymerised with acrylonitrile. Such attempts have shown that polymerisation is very difficult to control, and only moderate yields are obtained. Moreover, not all the comonomers under consideration are suitable for use in this process, since the polymerisation conditions most favourable for copolymerising a monomer containing acidic groups are not necessarily suitable for the copolymerisation of a monomer containing basic groups. It is, therefore, frequently found that polymers prepared in this way do not contain the comonomers in the desired ratio, and, for other reasons, cannot be dyed equally successfully with acidic or basic dyes.

Another method of preparing amphoteric acrylonitrile copolymers comprises the subsequent chemical treatment of copolymers containing suitable comonomers for example, by converting tertiary N-atoms in acrylonitrile copolymers into the corresponding quaternary compounds with the aid of halogenated monocarboxylic acids. These methods suffer from the disadvantages which, quite generally, attend chemical reactions on macromolecular substances, such as a non-uniform reaction rate within fairly large units, changes in the physical characteristics of the polymer particles, high expense and considerable labour.

Similar acrylonitrile copolymers may also be produced by copolymerising unsaturated betaines with acrylonitrile. There is, however, hardly any difference between these copolymers and other known copolymers which contain quaternised nitrogen atoms of basic character. They can be dyed in deep shades only with acidic dyes and not with basic dyes.

A process has now been found by which it is possible to produce amphoteric acrylonitrile copolymers which may readily be dyed deep shades both with basic and with acidic dyes, by copolymerising acrylonitrile with sulphonic acid betaines containing polymerisable monoethylenic groups optionally together with other polymerisable unsaturated compounds.

A dye receptive acrylonitrile copolymer is obtained comprising at least 80 percent by weight of acrylonitrile and a polymerisable sulfobetaine of the formula:

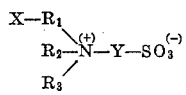

in which Y represents an alkylene radical with at least 3 carbon atoms, $R_1$ represents a bivalent lower aliphatic, an aromatic or an araliphatic radical or, together with N, $R_2$ and $R_3$, forms an aromatic heterocyclic ring which contains the quaternised nitrogen atom and, optionally, further hetero atoms, $R_2$ and $R_3$ represent lower alkyl radicals or, together with N, form a ring system which, in addition to the quaternised nirtogen, contains further heteroatoms, and X represents a radical of the formulae:

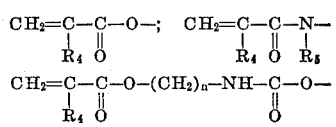

or

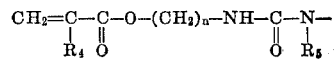

in which $R_4$ represents hydrogen or a lower alkyl radical, $R_5$ represents hydrogen or an alkyl or aryl radical and $n$ represents an integer from 2 to 6.

The sulphonic acid betaines may be prepared by the action of cyclic sulphonic acid esters, so-called sulphones, on unsaturated, tertiary amines, in which case the ring of the sulphones is opened and the amine is alkylated on the nitrogen in solvents at temperatures in the range from $+10$ to $150°$ C.

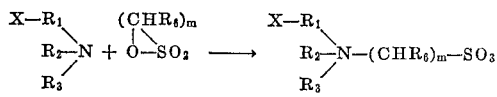

The meaning of $R_1$, $R_2$, $R_3$ and X in the formulae has already been explained. $R_6$ represents hydrogen or a lower alkyl radical and $m$ represents 3 or 4.

The following sulphonic acid betaines may, for example, be used as comonomers:

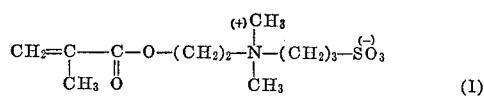
(I)

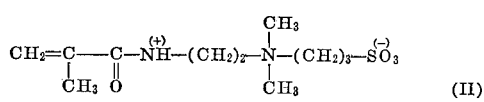
(II)

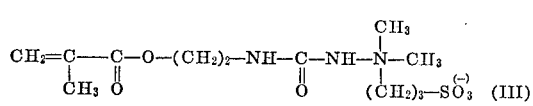
(III)

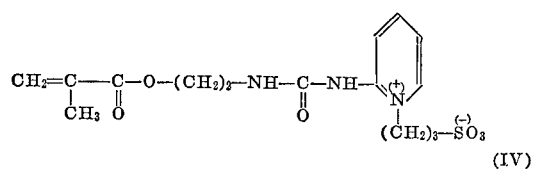
(IV)

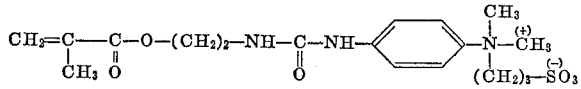
(V)

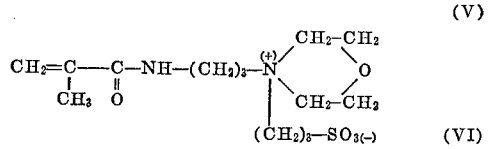
(VI)

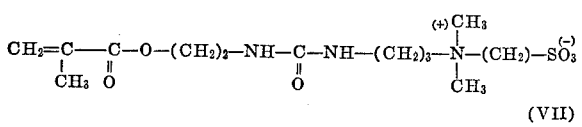
(VII)

The unsaturated, copolymerisable sulphonic acid betaines are colourless, solid compounds. They are readily soluble in water, soluble in methanol and ethanol (with some exceptions), but insoluble in most organic solvents. Their aqueous solutions are neutral. A few polymerise even at room temperature in the absence of air and atmospheric oxygen without a catalyst in the solid state. They may be copolymerised with a variety of unsaturated compounds.

The sulphobetaine content of the acrylonitrile copolymer may be varied within wide limits, and is preferably from 0.1 to 20% by weight, based on the total amount of monomer.

The greater part, but 80% at least, of the polymers according to the invention should be acrylonitrile. However, in addition to the sulphobetaines, other copolymerisable monoethylenically unsaturated monomers may be present such as methacrylates, vinyl acetate, vinyl chloride, vinylidene chloride, styrene, acrylamide, vinyl pyridine and styrene sulphonic acid.

One particular advantage of the process is that, apart from acrylonitrile, only one co-component is required to provide polymers with outstanding properties. By selecting a suitable sulphobetaine compound, the affinity of the polymers for dyes may be widely varied; both the maximum quantity of the dyes, acidic and basic, that can be absorbed and their ratio to one another can be controlled. In general, the desired quantity is at least 50 to 100 milliequivalents of dye/kg. of polymer, but, if desired, the amount may be considerably higher.

When polymerisation is carried out, the affinity of the polymers for dyes may be modified by the nature of the redox catalysts and the amounts in which they are used. The terminal sulfonic acid groups incorporated during the formation of the macromolecules are known to possess an affinity for cationic dyes. In addition, the terminal group content is variable with the molecular weight of the polymers and with their K-value. This provides a wide margin for additionally varying the affinity for basic dyes of polymers containing a certain amount of a particular sulphobetaine.

Polymerisation is carried out in the usual way. The polymerisation medium is water or a water-alcohol mixture which is used in an amount from 5 to 10 times that of the monomer. The polymerisation temperature is from $+10$ to $70°$ C., preferably 40 to $60°$ C. The pH-value of the polymerisation medium is from 2 to 5, preferably 3 to 4. It is adjusted to the desired value by addition of concentrated inorganic acids such as sulphuric or phosphoric acid. It is also possible to use mixtures of these acids, or concentrated organic acids, for example, aryl sulphonic acids.

Compounds which can form radicals are suitable for catalysing the polymerisation. Examples of such compounds are periodic compounds such as hydrogen peroxide, persulphates, alkyl or aryl peroxides, acyl and hydroperoxides. Azo compounds, such as azodiisobutyronitrile, may also be used. In general, however, redox systems, particularly the type based on peroxy compounds and compounds of sulphur in a low valency state are preferably used. Suitable peroxy compounds are the alkali metal salts of persulphuric acid, ammonium persulphate, the corresponding salts of pyrophosphoric acid or hydrogen peroxide. The alkali metal or ammonium salts of the pyrosulfurous or thiosulfuric acid may be considered for use as the sulphur compound. The quantities to be used can be from 0.3 to 3% based on the monomers to be polymerised, in the case of the peroxy compounds, and from 0.3 to 6% for the reducing agents. In general, a 2 to 5-fold molar excess of the reducing compounds is used. In many cases, small quantities of heavy metal compounds have proved successful as accelerators.

In addition to the salts used as redox catalysts, suitable neutral salts, such as alkali metal sulphates or phosphates, may be present in the polymerisation mixture. If desired, polymerisation regulators, such as aliphatic mercaptans, optionally those containing a hydroxyl group adjacent to the sulphydryl group, such as thioglycol, may also be used in the process according to the invention.

The copolymerisation of unsaturated sulpho betaines with acrylonitrile and possibly with other vinyl compounds may be carried out either in batches or continuously. It is possible here widely to vary the number of dye-receptive terminal groups and, thus, to vary the affinity for various types of dye (acidic, basic) by modifying the molecular weight of the copolymer. With suitable catalysts, copolymerisation proceeds smoothly and, after short reaction times, high yields are obtained with the high molecular weights required for fibres. The copolymers which are formed as fine particles may satisfactorily be further processed (e.g. by filtration or drying). They are readily soluble in the accepted solvents for acrylic polymers, such as dimethyl formamide, dimethyl acetamide, dimethyl sulphoxide or butyrolactone, and spinning solutions of high polymer concentration may be prepared. The viscosity of highly concentrated spinning solutions may be considerably reduced by the addition of an electrolyte.

The moulded articles, foils, films, filaments or fibres made from the copolymers according to the invention may readily be dyed with basic, acidic or dispersion dyes, to give very deep shades with excellent fastness to light and washing. In addition, fibres prepared from the aforementioned copolymers also have a very light natural colour, so that bleaching is often unnecessary. Further particularly valuable properties are the high thermostability and the resistance to other discolouring influences, such as alkalis and oxygen. Even with a fairly high sulphobetaine content, fibres and filaments made from the copolymers according to the invention possess outstanding physical properties. Despite the 10% content of co-component, the softening temperature is still in the same range as that of the pure nitrile polymer.

In the following examples and throughout the specification, parts and percentages represent parts by weight and percentage by weight, unless otherwise specified.

EXAMPLE 1

900 parts of demineralised water are acidified to pH 3.5 with sulphuric acid, introduced into a suitable reaction vessel, from which air has been displaced by nitrogen, and heated to 55° C. 3.5 parts of the unsaturated sulphobetaine IV and 66.5 parts of acrylonitrile are then added and the mixture is stirred until a solution is obtained. 0.6 part of potassium persulphate and 1.8 parts of sodium pyrosulphite are then added to the clear reaction mixture. After 20–30 seconds, clouding occurs to indicate that polymerisation has started. The reaction mixture is stirred for 3 hours at 50° C. under nitrogen pressure (5–10 mm. Hg). The finely particulate polymer which precipitates is separated by filtration, washed free of acid with demineralised water and dried at 60 to 70° C. The resulting copolymer has a K-value of 84 (acc. to Fikentscher, "Cellulosechemie," 13, p. 58, 1932): reaction rate 87%.

EXAMPLE 2

Polymerisation was carried out continuously in a closed reaction vessel. The individual components are continuously supplied by pumping and the polymer-containing reaction mixture removed through an overflow. The reactants were thoroughly intermixed by means of a turbo stirrer. The ratio between the effective capacity of the reaction vessel and the throughput was so selected that the residence time was 60 to 90 minutes.

1,450 parts of demineralised water were introduced into a reaction vessel with an effective capacity of 3,000 parts after it has been flushed with nitrogen, the temperature was adjusted to 45° C. and the pH-value to 3.5 with sulphuric acid. Over the next hour, the following components were continuously introduced: 1,500 parts/hour of demineralised water, 230 parts/hour of acrylonitrile, 260 parts/hour of a 10% aqueous solution of the unsaturated sulphonic acid betaine IV, 50 parts/hour of 4% potassium persulphate solution, 30 parts/hour of 20% sodium metabisulphite solution and as much dilute sulphuric acid as was necessary to keep the pH-value of the reaction mixture between 3.5 and 3.8. At the end of the first hour, the rate of addition of persulphate solution was reduced to 37.5 parts/hour and of bisulphite solution to 22.5 parts/hour. The polymer was separated by filtration from the continuously withdrawn reaction mixture, washed acid-free with demineralised water and dried in vacuo at 70° C.

Polymerisation was stopped after 14 hours. The yield amounted to 89% of the theoretical. The samples removed hourly after the second hour had K-values of 82 to 84.

Further copolymerisation tests similar to Examples 1 and 2 were carried out in which other sulphobetaine co-components in different ratios were copolymerised with acrylonitrile. The modified amounts of catalyst and activator and the results are given in Table 1.

TABLE 1

| Number | Co-component Description | Percent by wt. | Mol. percent | $K_2S_2O_8$, percent | $Na_2S_2O_5$, percent | Reaction percent | K-value |
|---|---|---|---|---|---|---|---|
| 1 | I | 5 | 0.99 | 0.70 | 1.05 | 90 | 83.7 |
| 2+ | I | 5 | 0.99 | 0.50 | 1.00 | 87 | 94.8 |
| 3 | I | 10 | 2.06 | 0.70 | 0.70 | 89 | 84.0 |
| 4+ | I | 10 | 2.06 | 0.50 | 0.60 | 81 | 83.0 |
| 5 | II | 5 | 0.94 | 0.70 | 1.05 | 80 | 82.5 |
| 6 | II | 5 | 0.94 | 0.60 | 1.20 | 88 | 81.4 |
| 7 | II | 10 | 1.97 | 0.65 | 0.65 | 78 | 80.2 |
| 8 | II | 10 | 1.97 | 0.55 | 0.75 | 81 | 81.5 |
| 9 | III | 5 | 1.15 | 0.75 | 1.00 | 78 | 92.0 |
| 10 | III | 10 | 2.39 | 0.55 | 0.55 | 75 | 83.0 |
| 11 | IV | 5 | 0.74 | 0.85 | 2.55 | 87 | 81.5 |
| 12+ | IV | 5 | 0.74 | 0.70 | 2.10 | 89 | 79.2 |
| 13 | IV | 8 | 1.22 | 0.80 | 2.40 | 90 | 86.0 |
| 14 | IV | 10 | 1.55 | 0.80 | 2.40 | 91 | 83.3 |
| 15+ | IV | 10 | 1.55 | 0.65 | 2.00 | 89 | 84.4 |
| 16 | IV | 12 | 1.90 | 0.75 | 2.25 | 93 | 83.4 |
| 17 | V | 5 | 0.67 | 0.60++ | 1.20 | 70 | 95.0 |
| 18 | IV / AME | 8 / 4 | 1.22 / 2.70 | 0.80 | 2.40 | 91 | 86.4 |
| 19 | IV / AME | 8 / 8 | 1.22 / 5.48 | 0.80 | 2.40 | 90 | 86.7 |
| 20 | IV / MBS | 8 / 1 | 1.22 / 0.23 | 0.85 | 2.55 | 89 | 92.8 |
| 21 | | | | 0.70 | 2.80 | 80 | 79.5 |
| 22 | AME | 5 | 3.44 | 0.85 | 2.55 | 79 | 82.2 |
| 23 | AME | 10 | 6.40 | 0.85 | 2.55 | 81 | 90.1 |
| 24 | AME / MBS | 5 / 0.5 | 3.44 / 0.12 | 0.80 | 2.40 | 85 | 85.6 |

+ Polymerised according to Example 2.
++ Potassium chlorate.
AME=Methyl acrylate.
MBS=Methacroylaminobenzene-benzene-disulphonimide German Application (DAS 1 039 548).

EXAMPLE 3

The change in colour (discolouration) of the polymers was tested in dimethyl formamide solution at fairly high temperatures in the presence of air: 5% solutions were heated at 80° C. (in an Ultrathermostat). After heating times of 2, 4 and 20 hours, samples were taken and the extinction values measured by an electrophotometer (Typr Elko III manufactured by Messrs. Zeiss) at 450 m$\mu$ wavelength. The measurements were made in a 5 cm. cell in pure dimethyl formamide as the control solution. The measured values are given in Table 2.

TABLE 2

| Number | Extinction. 100, after— 2 hr. | 4 hr. | 20 hr. | Amount of dye absorbed (g. dye/g. film) 100 Basic | Acid |
|---|---|---|---|---|---|
| 1 | 41 | 59 | 72 | 0.53 | 0.27 |
| 2 | 21 | 28 | 55 | 0.23 | 0.22 |
| 3 | 36 | 52 | 69 | 1.20 | 0.62 |
| 4 | 19 | 26 | 47 | 0.36 | 0.51 |
| 5 | 28 | 39 | 76 | 0.62 | 0.23 |
| 6 | 25 | 34 | 62 | 0.58 | 0.27 |
| 7 | 33 | 38 | 53 | 1.22 | 1.15 |
| 8 | 31 | 35 | 50 | 1.21 | 1.22 |
| 9 | 41 | 50 | 68 | 0.22 | 0.13 |
| 10 | 40 | 48 | 61 | 1.26 | 0.90 |
| 11 | 36 | 50 | 80 | 0.39 | 0.54 |
| 12 | 31 | 42 | 72 | 0.28 | 0.56 |
| 13 | 35 | 48 | 77 | 0.80 | 1.66 |
| 14 | 35 | 57 | 86 | 1.15 | 2.88 |
| 15 | 27 | 38 | 68 | 0.40 | 2.56 |
| 16 | 37 | 40 | 90 | 1.28 | 3.60 |
| 17 | 98 | 109 | 169 | 0.40 | 0.30 |
| 18 | 40 | 52 | 81 | 0.89 | 1.70 |
| 19 | 43 | 58 | 87 | 1.03 | 1.84 |
| 20 | 32 | 41 | 52 | 1.23 | 1.78 |
| 21 | 44 | 62 | 87 | 0.12 | 0.55 |
| 22 | 35 | 52 | 75 | 0.23 | 0.00 |
| 23 | 31 | 51 | 67 | 0.37 | 0.05 |
| 24 | 39 | 53 | 83 | 0.40 | 0.05 |
| 25+ | 205 | 231 | 279 | <0.05 | 3.90 |
| 26++ | 304 | 384 | 448 | 0.72 | 0.39 |

+ Copolymer with 5% vinyl pyridine sulpho betaine, polymerised according to Example 1, K-value=91.
++ Same copolymer as (+); catalyst KClO₃ instead of K₂S₂O₈; K-value=90.

EXAMPLE 4

18% solutions in dimethyl formamide were prepared from the polymers produced in accordance with Examples 1 and 2. Films of equal thickness were made from these solutions. After drying for 20 hours at 50° C., the films are washed free from solvent with warm water and dried. The films thus prepared were dyed to saturation with an acidic dye. (Acilandirektblau A, Colour Index, 2nd Ed., vol. I, No. 1264) and with a basic dye (Astrazonblau B, Colour Index, 2nd Ed., No. 42, 140; vol. III). The amounts of dye absorbed were determined by colorimetric analysis. The values (g.dye/g. film) are given in Table 2. (For a detailed description of the dyeing methods and preparation of the dyes, see Example 6.)

EXAMPLE 5

The copolymers described above, were converted into 24 to 27% homogeneous solutions in dimethyl formamide by stirring at about 70° C. depending on the K-value. After filtration in the normal manner, these solutions are spun by the dry spinning process. The resulting filaments are then stretched to 4 times their original length in boiling water, whereafter they are dried, still stretched, and heated for 10 minutes at 120° C. The filaments had a denier of 3 and a natural colour of white. Hot-air tempering of the crimped filaments at 160° C. for another hour (in view of the tendency to discolour under the influence of heat), showed that the copolymers according to the invention have satisfactory heat-stability. After the treatment, the filaments had only a very pale yellow tinge. In contrast, filaments which contained basic co-components, such as vinyl pyridines or vinyl pyridine sulpho betaines, became discoloured to a much greater extent under the same conditions (light to medium brown).

EXAMPLE 6

Filaments and fibres produced from the copolymers containing sulphobetaines could readily be dyed to very deep shades with basic and acidic dyes. Dyeing was carried out as follows:

(a) Basic:

| | Ml. |
|---|---|
| Astrazonblau B (1 g./l.) | 100 |
| Acetic acid (30 g./l.) | 2 |
| Sodium acetate (40 g./l.) | 0.3 |

Astrazonblau B is dissolved in boiling water, filtered and then measured off while hot. 2 g. of fibres are added at a dyeing bath temperature of 80° C. and after the boiling temperature has been reached, are dyed for 1 hour.

(b) Acid:

| | Ml. |
|---|---|
| Acilandirektblau A (1 g./l.) | 100 |
| Sulphuric acid (100 g./l.) | 0.8 |

The dye does not have to be dissolved at a high temperature. For dyeing, see (a).

The dyed filaments are thoroughly washed with water, centrifuged and dried.

In order that the amount of dye absorbed may be quantitatively determined, the dyed filaments and films are carefully dissolved in dimethyl formamide. Measurement was made with the aid of a spectroscopic photometer and a calibration curve. Table 3 shows the measured values (g. dye/g. fibre.)

TABLE 3

| Composition | | | Stretching ratio | Affinity for dyes (g. dye/g. fibre) 100 | |
|---|---|---|---|---|---|
| Monomer¹ | Molar ratio | K-value | | Basic | Acid |
| AN: AME (control) | 96.6:3.4 | 85 | 1:4 | 0.24 | <0.05 |
| AN:IV | 99.2:0.8 | 83 | 1:4 | 0.66 | 1.23 |
| AN:IV | 98.8:1.2 | 85 | 1:4 | 0.91 | 2.05 |
| AN:IV | 98.4:1.6 | 81 | 1:4 | 1.15 | 3.24 |
| AN:IV | 98.0:2.0 | 84 | 1:4 | 1.28 | 4.30 |
| AN:III | 97.8:2.2 | 83 | 1:4 | 1.50 | 1.15 |
| AN:II | 98.0:2.0 | 82 | 1:4 | 1.34 | 1.26 |
| AN:I | 97.9:2.1 | 83 | 1:4 | 1.21 | 1.42 |
| AN:IV:AME | 95.4:1.2:3.4 | 85 | 1:4 | 1.01 | 2.44 |

¹ AN=Acrylonitrile; AME=Methyl methacrylate.

What we claim is:

1. An amphoteric copolymer comprising at least about 80% by weight of acrylonitrile and a polymerizable sulfobetaine having the formula

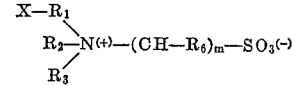

in which $R_6$ is selected from the group consisting of hydrogen and lower alkyl, $m$ is 3–4, $R_2$ and $R_3$ each respectively is lower alkyl, both of which when taken together with N form a ring system, $R_1$ is selected from the group consisting of bivalent lower aliphatic and aromatic, with the proviso that $R_1$ when taken together with N, $R_2$ and $R_3$ form a pyridyl ring, and X is a radical corresponding to the formula selected from the group consisting of

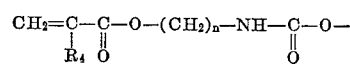

and

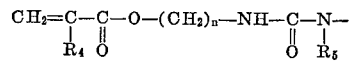

in which $R_4$ is selected from the group consisting of hydrogen and lower alkyl, $R_5$ is selected from the group consisting of hydrogen, alkyl and aryl, and $n$ is 2–6.

2. Copolymer according to claim 1 wherein $R_1$ is phenyl, but with the proviso that $R_1$ when taken together with N, $R_2$ and $R_3$ form a pyridyl ring, $R_4$ is lower alkyl and $R_5$ is hydrogen.

3. Copolymer according to claim 1 wherein said copolymer is in the form of a filament.

4. Copolymer according to claim 1 wherein from about 1–10% by weight of a copolymerizable ethylenically unsaturated monomer other than said polymerizable sulfobetaine and from about 0.1–10% by weight of said polymerizable sulfobetaine are present in copolymerized form in said copolymer.

5. Copolymer according to claim 4 wherein said copolymer is in the form of a filament.

6. Copolymer according to claim 4 wherein said ethylenically unsaturated monomer is acrylic acid methyl ester.

7. An amphoteric copolymer comprising at least about 80% by weight of acrylonitrile and polymerizable sulfobetaine having the formula

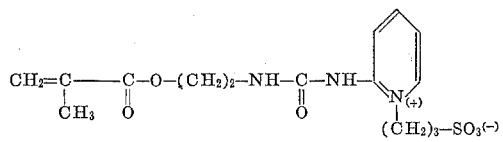

8. An amphoteric copolymer comprising at least about 80% by weight of acrylonitrile and a polymerizable sulfobetaine having the formula

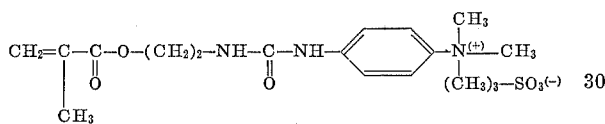

9. Process for the production of dye receptive amphoteric acrylonitrile copolymers containing at least about 80% by weight of acrylonitrile with any balance being another monoethylenically unsaturated monomer, which comprises copolymerizing acrylonitrile with an unsaturated sulfobetaine having the formula

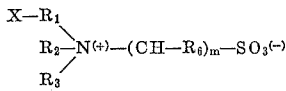

in which $R_6$ is selected from the group consisting of hydrogen and lower alkyl, $m$ is 3–4, $R_2$ and $R_3$ each respectively is lower alkyl, both of which when taken together with N form a ring system, $R_1$ is selected from the group consisting of bivalent lower aliphatic and aromatic, with the proviso that $R_1$ when taken together with N, $R_2$ and $R_3$ form a pyridyl ring, and X is a radical corresponding to the formula selected from the group consisting of

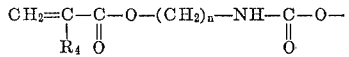

and

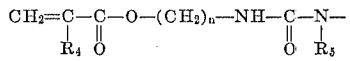

in which $R_4$ is selected from the group consisting of hydrogen and lower alkyl, $R_5$ is selected from the group consisting of hydrogen, alkyl and aryl, and $n$ is 2–6, in an aqueous medium in the presence of a redox-catalyst system, and recovering the dye receptive acrylonitrile copolymer from the polymerization medium.

10. Process according to claim 9 wherein at least about 80% by weight of acrylonitrile and about 1–10% by weight of a monoethylenically unsaturated monomer selected from the group consisting of methylacrylate, vinyl acetate and methacroylaminobenzene-benzene-disulfonimide, are copolymerized in the presence of about 0.1–20% by weight of said unsaturated sulfobetaine.

11. Process according to claim 9 wherein said sulfobetaine has the formula

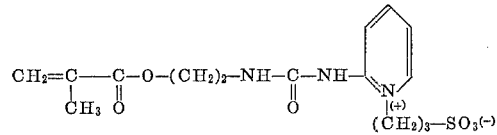

12. Process according to claim 9 wherein said sulfobetaine has the formula

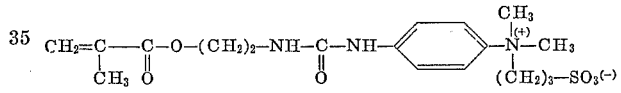

References Cited

UNITED STATES PATENTS 2,794,015  5/1957  Jackson et al. _____ 260—85.5
2,810,713  10/1957  Melamed _____ 260—80.5

JAMES A. SEIDLECK, Primary Examiner

U.S. Cl. X.R.

8—55